United States Patent Office 2,976,145
Patented Mar. 21, 1961

2,976,145
PHOTOGRAPHIC MATERIALS

Albert Baril, Jr., and Elias Klein, Metairie, La., assignors to Kalvar Corporation, New Orleans, La., a corporation of Louisiana No Drawing. Filed June 4, 1957, Ser. No. 663,360

4 Claims. (Cl. 96—49)

The present invention is concerned with photographic materials and processes of using same.

Broadly stated, the photographic material according to the invention comprises a supported or unsupported film or vehicle having a certain type of photolytic diazonium compound dispersed therein. Diazonium compounds which may be used in the preparation of the present materials may be represented by the following structural formula:

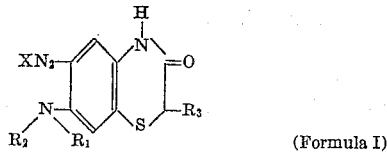

(Formula I)

wherein $R_1$ and $R_2$ stand for a member of the group consisting of alkyl and aralkyl, $R_3$ stands for a member of the group consisting of hydrogen, alkyl and aralkyl, and X stands for halogen. The alkyl substituent may be either lower or higher alkyl, e.g. the alkyl group may include as many as four carbon atoms, although, preferably, this substituent is methyl or ethyl. Typical alkyl aryl radicals are methylphenyl, ethylphenyl, ethylnaphthyl and the like. The X substituent may stand for any halogen atom although chloride is preferred.

As specific examples of the diazonium compound utilized in the present invention, there may be mentioned the following:

7 - dimethylamino - 3 - oxo - dihydro - 1,4 - thiazine - 6-diazonium chloride;
6 - dimethylamino - 3 - oxo - dihydro - 1,4 - thiazine - 6-diazonium chloride;
6 - dimethylamino - 3 - oxo - dihydro - 1,4 - oxazine - 6-diazonium chloride;
7 - dimethylamino - 8 - methoxy - 3 - oxo - dihydro - 1,4-thiazine-6-diazonium chloride;
6 - dimethylamino - 2 - methyl - 3 - oxo - dihydro - 1,4-thiazine-6-diazonium chloride.

The invention also contemplates the use of the stabilized complex metal salts of the above compounds, such salts being represented by the formula:

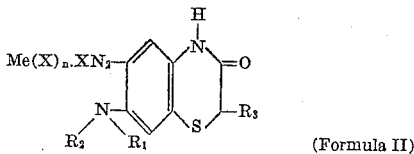

(Formula II)

wherein X, $R_1$ $R_2$ and $R_3$ have the meaning stated above, Me stands for a salt-forming element and $n$ stands for 2 or 3. Preferably, Me is selected from the group consisting of zinc, boron, cadmium, tin, nickel and cobalt. Such complex salts may be prepared by reacting the parent compound represented by Formula I with a metal salt such as zinc chloride, cadmium chloride, cobalt chloride, stannic chloride, nickel chloride, the corresponding bromides, fluorides or iodides, boron trifluoride or the like.

Of the specific compounds mentioned heretofore, 7-dimethylamino - 3 - oxo - dihydro - benzo - 1,4 - thiazine-6-diazonium chloride as such or in a stabilized complex metal form, e.g. the zinc chloride double salt, is particularly unique and advantageous. This compound, and the various other diazonium compounds contemplated for use herein, are characterized by being photolytic, i.e. they decompose with the release of nitrogen, in the visible range of the light spectrum and they have an absorption peak within that range. In contrast, most other light sensitive diazonium compounds are substantially sensitive only to wave lengths shorter than or at the very margin of the visible range of the spectrum and such compounds require special provisions, such as quartz optics, for photographic use. However, we have found that the compounds described for use herein, and particularly 7 - dimethylamino - 3 - oxo - dihydro - benzo - 1,4-thiazine-6-diazonium chloride, have sharp absorption peaks of decomposition in the visible violet to green portion of the light spectrum and may be used with ordinary optical apparatus where it is desired to exploit their photosensitive properties. Moreover, this absorption range permits exposure with efficient and high energy sources emitting light of a wave length which essentially coincides with the sensitivity range of the new compound (for example, tungsten incandescent lamp) which results, in conjunction with the use, if desired, of highly transmissive optical glass, in an appreciable increase of photographic speed.

In view of the above noted characteristics, the compounds illustrated by Formulae I and II are uniquely adapted for use in photographic material wherein the diazonium compound is decomposed by exposure to light of the type discussed above according to an image pattern, a permanent image record being obtained by heating the exposed material to develop suitable light scattering centers. Photographic material of this type comprises a suitable vehicle or matrix in which the diazonium compound is dispersed. Preferably, although not necessarily, the vehicle is coated upon a base or support, e.g. a sheet of paper, glass or synthetic resin such as polyethylene terephthalate (Mylar). Typical vehicles for use with the present compounds include gums, proteins, polymeric carbohydrates and natural and synthetic resins. Thus, the vehicle may consist essentially of gelatin or one or more synthetic thermoplastic polymers including such vinyl polymers as polyvinylidene chloride, polystyrene, polyvinyl chloride and the copolymers of vinyl chloride with vinylidene chloride or acrylonitrile.

The products of Formula I may be prepared in conventional fashion, e.g. by diazotizing a compound of the formula:

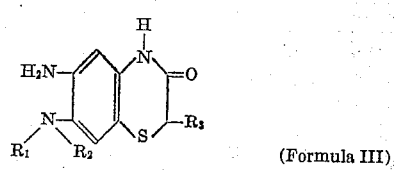

(Formula III)

wherein $R_1$, $R_2$ and $R_3$ have the meaning stated above with sodium nitrite in an acid medium. The resulting diazonium compound may be converted to the stabilized metal salt form illustrated by Formula II by reaction with a suitable salt-forming metal, e.g. zinc chloride.

The invention is illustrated, but not limited by the following examples:

*Example 1*

16 gms. of the copolymer of vinylidene chloride and acrylonitrile known as "Saran F–120" (a product of the Dow Chemical Company) were dissolved in 75 cc. of methyl ethyl ketone. To this solution there was added slowly 12 gms. of the zinc chloride stabilized salt of 7-dimethylamino - 3 - oxo - dihydro - benzo - 1,4 - thiazine-6-diazonium chloride dissolved in 20 cc. of methyl alcohol. This emulsion was coated onto a suitable supporting media, e.g. a sheet of polyethylene terephthalate ("Mylar"). The resulting photographic material furnished an excellent non-dyed textured image record in the vehicle upon exposure to an original by contact for several seconds using a high intensity tungsten lamp at room temperature (20–25° C.), and development by uniform heating to about 250° F., for several seconds.

The zinc chloride diazonium salt used above was prepared as follows:

To 11.76 grams (0.07 mol) of 2-amino-5-dimethylaminothiophenol was added a solution of 15.2 grams (0.380 mol) of sodium hydroxide in 50 ml. of water and 10.4 grams (0.0893 mol) of sodium chloroacetate in 30 ml. of water.

The resulting solution was refluxed for 30 minutes. After the cautious addition of 53 ml. (1.7 mols) of concentrated hydrochloric acid the solution was again refluxed for 30 minutes. The resulting dark blue solution was carefully made basic to litmus with anhydrous sodium carbonate. The dark blue-green mixture was cooled to 0° in the refrigerator and then filtered. The green solid was washed with water until the washings were nearly colorless and after being dried was recrystallized from hot benzene, treating the solution several times with norite. The product consisted of 4.9 g. (33%) of tan plates, M.P. 185–189°.

The thiazine was converted to 6-nitro-7-dimethyl-amino-3-oxo-dihydro-benzo-1,4-thiazine as follows:

In a solution of 6.2 ml. (0.15 mol) of sulfuric acid (d. 1.84) and 100 ml. of water cooled in an ice-salt bath was dissolved 5.4 g. (0.025 mol) of the above thiazine. A solution of 3.8 g. (0.055 mol) of sodium nitrite in 10 ml. of water was added dropwise, keeping the temperature of the solution at 2°. The red mixture was allowed to stand at 2° for 15 minutes and was then made alkaline to litmus with solid anhydrous sodium carbonate. After cooling in the refrigerator the orange-red solid was filtered, washed with water and air dried. Recrystallization from hot ethanol (norite) yielded 6.0 g. (95%) of 6-nitro-7-dimethylamino-3-oxo-dihydro-benzo-1,4-thiazine in the form of small red needles, M.P. 204–208°.

6 - amino - 7 - dimethylamino - 3 - oxo - dihydro - benzo-1,4-thiazine was then prepared as follows:

In a solution of 10 ml. of concentrated hydrochloric acid and 10 ml. of water was dissolved 6.0 g. (0.024 mol) of the above nitro thiazine. To the suspended yellow solid was added gradually with warming 6.1 g. (0.051 mols) of mossy tin. An additional 10 ml. (total of 0.46 mol) of concentrated hydrochloric acid was then added. In a few minutes the yellow liquid became colorless. An additional 20 ml. of water was added and most of the excess tin was removed by decantation. A solution of 20.0 g. (0.500 mol) of sodium hydroxide in 40 ml. of water was then added, causing the precipitation of a white solid. The solid was filtered, washed with water and then dried in vacuo. The weight of crude products was 3.8 g. (72%), M.P. 205–209°. This product was then converted to the zinc chloride stabilized salt of 7 - dimethylamino - 3 - oxo - dihydro - benzo - 1,4 - thiazine-6-diazonium chloride as follows:

In 20 ml. of water was suspended 2.2 g. (0.098 mol) of the above crude amino thiazine. Addition of 4.3 ml. (0.14 mol) of concentrated hydrochloric acid and 10 ml. of water brought about nearly complete solution. The solution was cooled to 0° in an ice-salt bath and dropwise was added a solution of 0.7 g. (0.01 mol) of sodium nitrite in 5 ml. of water, keeping the temperature at 0°. The deep red solution was allowed to stand in the ice bath for about 10 minutes, norite was added and the solution was filtered, keeping the filter flask well cooled by the ice bath. To the filtered solution was added a solution of 1.0 g. (0.0074 mol) of zinc chloride in 5 ml. of water. Scratching the walls of the beaker brought about precipitation of a deep red solid. This was washed with 15 ml. of a 1:1 solution of acetone and water (in which it seems to be rather soluble) followed by 50 ml. of ether. The weight of tiny red needles was 1.5 g. (37%), decomposing with melting near 180° (began to darken near 150°). The salt was fairly soluble in water and methanol, very soluble in N,N-dimethylformamide, and insoluble in methyl ethyl ketone.

*Example II*

This example illustrates the use of gelatin as the vehicle in the preparation of a photographic material according to the invention.

Ten gms. of high grade dry gelatin were soaked for several hours in 190 ml. of distilled water of 30° C. To this was added 1 gr. of the zinc chloride diazonium salt used in Example I. This was then diluted with water to make 200 ml. The resulting emulsion was then coated on paper by conventional means.

Upon exposure through an original and development by uniform heating, in the manner of Example I, the material furnished a highly desirable textural record.

It will be appreciated from the foregoing that various modifications may be made in the invention as illustrated by the foregoing examples without deviating in any way from the scope and meaning thereof: Thus, while the examples show the use of the zinc chloride salt of 7-dimethylamino - 3 - oxo - dihydro - benzo - 1,4 - thiazine - 6-diazonium chloride, other compounds encompassed by Formula I or Formula II may be used in the manner illustrated. Other modifications will also be apparent to those skilled in the art. Hence, the foregoing description is not intended to limit the invention as defined in the following claims wherein what is claimed is:

What is claimed is:

1. A photographic material capable of furnishing a record solely in the form of a distribution pattern of radiation scattering discontinuities formed within an otherwise substantially homogeneous vehicle, said vehicle consisting essentially of a synthetic, thermoplastic, water-insoluble vinylidene chloride polymer having uniformly dispersed therein, as the sole essential image producing agent, a photolytic diazonium compound having the formula

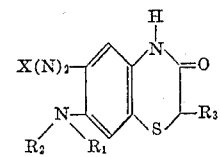

wherein $R_1$ and $R_2$ stand for alkyl groups, $R_3$ stands for a member of the group consisting of hydrogen, alkyl and alkyl aryl, and X stands for halogen, said agent being decomposable upon exposure to light in the visible spectrum into products which are chemically non-reactive to said polymer and upon warming are volatile to form light scattering discontinuities only in the light struck areas.

2. A photographic material capable of furnishing a record solely in the form of a distribution pattern of radiation scattering discontinuities formed within an otherwise substantially homogeneous vehicle, said vehicle consisting essentially of a synthetic, thermoplastic, water-insoluble vinylidene chloride polymer having uniformly dispersed therein, as the sole essential image producing agent, a photolytic diazonium compound having the formula

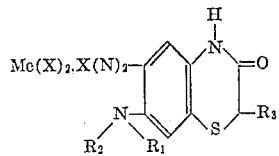

wherein $R_1$ and $R_2$ stand for alkyl groups, $R_3$ stands for a member of the group consisting of hydrogen, alkyl, and alkyl aryl, X stands for halogen and Me stands for a salt-forming metal, said agent being decomposable upon exposure to light in the visible spectrum into products which are chemically non-reactive to said polymer and upon warming are volatile to form light scattering discontinuities only in the light struck areas.

3. A photographic material as defined in claim 2 wherein said diazonium compound is the zinc chloride salt of 7 - dimethylamino - 3 - oxo - dihydro - benzo - 1,4 - thiazine-6-diazonium chloride.

4. The process which comprises exposing to light in the visible spectrum according to a predetermined pattern, photographic material according to claim 1 whereby said compound is decomposed according to said image pattern, and thereafter dry heating said exposed material to develop light scattering centers where said compound has been decomposed.

References Cited in the file of this patent

UNITED STATES PATENTS 2,703,756    Herrick et al. _____ Mar. 8, 1955

FOREIGN PATENTS 763,721    Germany _____ Oct. 5, 1953